(12) United States Patent
Kim et al.

(10) Patent No.: US 6,841,967 B2
(45) Date of Patent: Jan. 11, 2005

(54) COIL WINDING NUMBER VARIABLE TYPE MOTOR AND COIL WINDING NUMBER VARYING METHOD FOR VARYING COOLING AND HEATING CAPACITY OF RECIPROCATING COMPRESSOR

(75) Inventors: Hyung Jin Kim, Seoul (KR); Kye Si Kwon, Seoul (KR); Hyuk Lee, Siheung (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/983,942

(22) Filed: Oct. 26, 2001

(65) Prior Publication Data

US 2002/0113565 A1 Aug. 22, 2002

(30) Foreign Application Priority Data

Dec. 27, 2000 (KR) ......................................... 2000-82914

(51) Int. Cl.[7] .............................. H02P 1/24; H02P 1/42; H02P 3/18; H02P 5/28
(52) U.S. Cl. ........................ 318/727; 318/773; 318/780; 318/790
(58) Field of Search ................................. 318/552–557, 318/766, 727, 773–777, 780, 789–790

(56) References Cited

U.S. PATENT DOCUMENTS

| | | | | |
|---|---|---|---|---|
| 3,697,842 A | * | 10/1972 | Morrill | 318/781 |
| 3,931,554 A | * | 1/1976 | Spentzas | 310/30 |
| 4,263,540 A | * | 4/1981 | Brandt et al. | 310/198 |
| 4,322,665 A | * | 3/1982 | Landgraf | 318/774 |
| 4,724,680 A | * | 2/1988 | Kawai | 318/779 |
| 6,040,679 A | * | 3/2000 | Monk et al. | 318/766 |

FOREIGN PATENT DOCUMENTS

| | | |
|---|---|---|
| CN | 1156814 | 8/1997 |
| JP | 51-90104 A | 7/1976 |
| JP | 58-15486 A | 1/1983 |
| JP | 9-126146 A | 5/1997 |
| JP | 9-250449 A | 9/1997 |
| JP | 2000-121180 A | 4/2000 |
| JP | 2000-145632 A | 5/2000 |

OTHER PUBLICATIONS

"A speed adjustment method for a single–phase fan motor," *Journal of Herbei Engineering and Technical College*, Sep., 2000.

* cited by examiner

*Primary Examiner*—Marlon Fletcher
(74) *Attorney, Agent, or Firm*—Fleshner & Kim, LLP

(57) ABSTRACT

A coil winding number variable type motor for varying a cooling and heating capacity of a reciprocating motor includes: a plurality of coils separately wound and connected in series to each other so as to vary turn ratio among motor coils; a plurality of relays respectively connected between adjacent coils among the plurality of coils; and a relay controller for outputting and ON/OFF control signal for varying the winding number of the motor coil and controlling the relays according to a change in a load and a power supply voltage. The coil wound in the motor of the reciprocating compressor is divided into the main coil and the plurality of sub-coils and the winding number of the motor coil is varied by itself to control the stroke of the reciprocating compressor, thereby effectively coping with the change in the voltage or the load.

20 Claims, 3 Drawing Sheets

COIL WINDING NUMBER VARIABLE TYPE MOTOR AND COIL WINDING NUMBER VARYING METHOD FOR VARYING COOLING AND HEATING CAPACITY OF RECIPROCATING COMPRESSOR

BACKGROUND OF THE INVENTION

1. Field of the Invention

The present invention relates to a motor of a reciprocating compressor, and more particularly, to a coil winding number variable type motor that is capable of controlling a stroke by varying the number of windings of motor coil by itself, and a coil winding number varying method for varying cooling and heating capacity of a reciprocating compressor

2. Description of the Background Art

FIG. 1 is a schematic block diagram showing the construction of an operation control apparatus of a reciprocating compressor in accordance with a conventional art.

As shown in FIG. 1, the operation control apparatus includes a reciprocating compressor 10A for controlling a cooling capacity by varying a stroke through a linear movement of a piston (not shown), an electricity circuit unit 10 with a ground terminal connected between a current sensing resistance R1 and an AC switching device, that is, a triac (Tr1), and supplying a voltage and a current to the reciprocating compressor 10A according to a switching signal of the triac (Tr1); a current detector 20 for detecting a current applied to the reciprocating compressor 10A on the basis of the ground terminal and outputting the detected current; a voltage detector 30 for detecting a voltage applied to the reciprocating compressor 10A on the basis of the ground terminal, and outputting the detected voltage, computing a stroke, and inputting a switching signal for controlling the voltage applied to the reciprocating compressor 10A to the triac (Tr1), so as for the stroke to follow an initial stroke reference value.

The operation of the operation control apparatus of a reciprocating compressor constructed as described above will now be explained with reference to the accompanying drawings.

First, in the reciprocating compressor 10A, an internal piston performs a linear reciprocal movement by a stroke voltage according to an initial stroke reference value set by a user, and accordingly, the stroke is varied and cooling capacity of a refrigerator or an air-conditioner is varied according to the varied stroke.

A Turn-On period of the triac is lengthened by the switching control signal of the microcomputer 40, and accordingly the stroke is increased. At this time, a voltage and a current generated from the reciprocating compressor 10A are detected by the voltage detector 30 and the current detector 20 and applied to the microcomputer 40.

Then, the microcomputer 40 computes a stroke by using the voltage and the current detected by the voltage detector 30 and the current detector 20, compares the computed stroke with the initially applied stroke reference value, and outputs a switching control signal accordingly.

That is, if the computed stroke is smaller than the initial stroke reference value, the microcomputer 40 outputs a switching control signal for lengthening an ON period of the triac (Tr1), to thereby increase the stroke voltage applied to the reciprocating compressor 10A.

If, however, the computed stroke is greater than the initially applied stroke reference value, the microcomputer outputs a switching control signal for shortening the ON period of the triac (Tr1), to reduce the stroke voltage applied to the reciprocating compressor 10A.

In the motor of the reciprocating compressor 10A, an internal coil is wound in a predetermined number and driven by the stroke voltage.

Accordingly, the operation control apparatus of a reciprocating compressor of the conventional art controls the ON/OFF period of the triac and accordingly performs a stroke control, to thereby cope with the load and the voltage change.

However, the conventional operation control apparatus of a reciprocating compressor has the following problems.

That is, in order to control the stroke, since the driving voltage applied to the motor of the reciprocating compressor is controlled by varying the ON/OFF period of the switching signal inputted to the triac, a noise is generated according to switching, a circuit such as a noise filter is additionally required to cancel the noise, resulting in that its expense is increased.

In addition, in case that the stroke is controlled by varying the ON/OFF period of the triac by switching, a power factor is influenced due to a harmonic wave, for which a circuit is additionally required, also resulting in that the expense is increased.

Moreover, due to a surge voltage (a voltage which is instantly increased), the triac is broken down, and due to the harmonic wave component generated by the triac, an efficiency of the reciprocating compressor is degraded.

SUMMARY OF THE INVENTION

Therefore, an object of the present invention is to provide a coil winding number variable type motor for varying a cooling and heating capacity of a reciprocating compressor that is capable of varying the number of winding, a capacity of a motor itself, by itself to cope with a load and a voltage change.

To achieve these and other advantages and in accordance with the purpose of the present invention, as embodied and broadly described herein, there is provided a coil winding number variable type motor for varying a cooling and heating capacity of a reciprocating compressor, including: a plurality of coils separately wound and connected in series to each other so as to vary turn ratio among motor coils; a plurality of relays respectively connected between adjacent coils among the plurality of coils: and a relay controller for outputting an ON/OFF control signal for varying the winding number of the motor coils and controlling the relays according to the change in a load and a power supply voltage.

To achieve the above object, there is also provided a method for varying an electricity capacity of a coil winding number variable type motor for varying a cooling and heating capacity, including the steps of: judging the winding number of coil required for stroke control when a predetermined voltage is applied to a reciprocating compressor; applying a voltage only to a main coil and reducing the winding number of coil in case that occurrence of a great stroke is required for the reciprocating compressor; and applying a voltage to the main coil and a sub-coil and increasing the winding number of coil in case that occurrence of a small stroke is required for the reciprocating compressor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
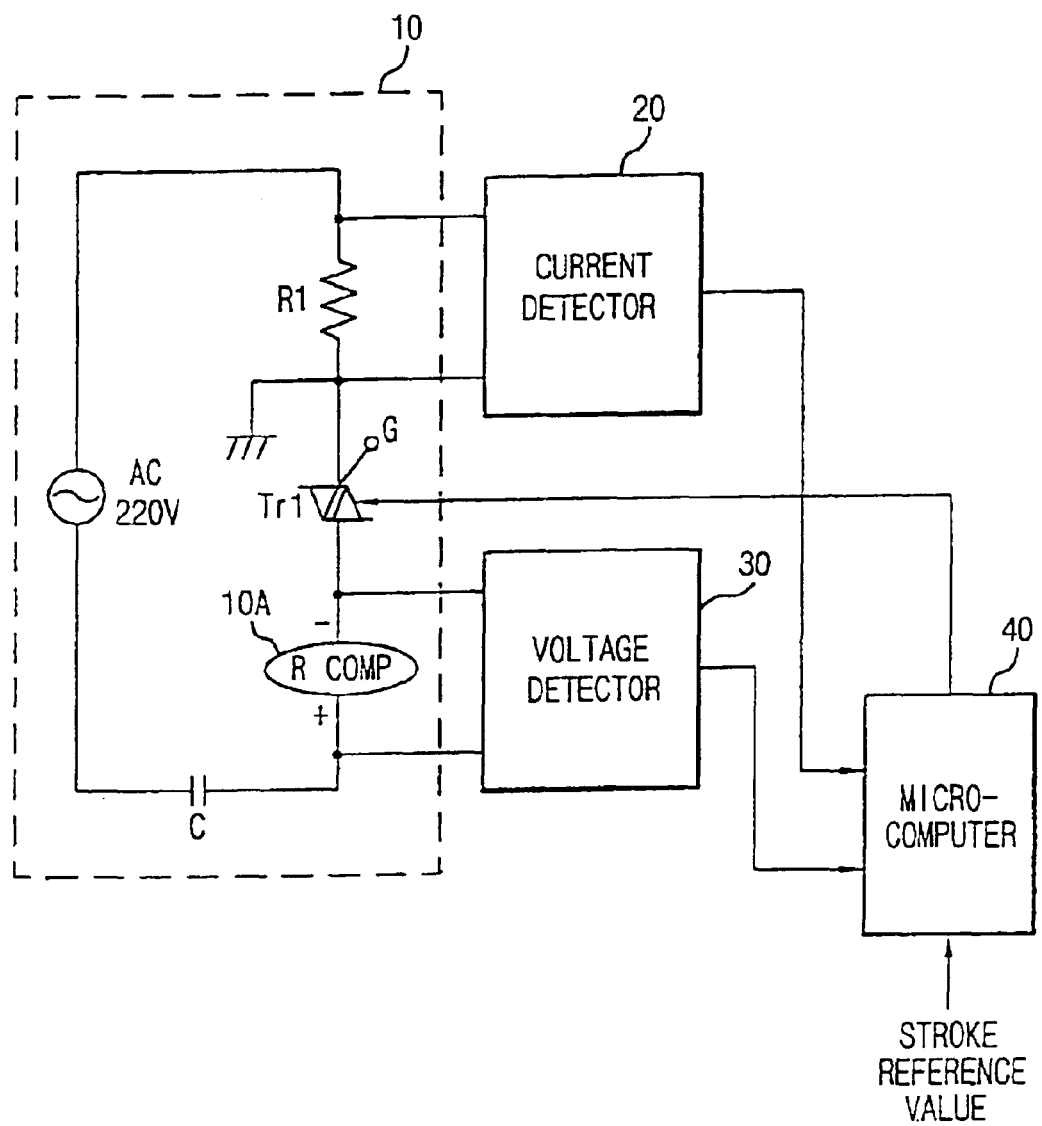
FIG. 1 is a schematic block diagram of an operation control apparatus of a reciprocating compressor in accordance with a conventional art.
Figure 2:
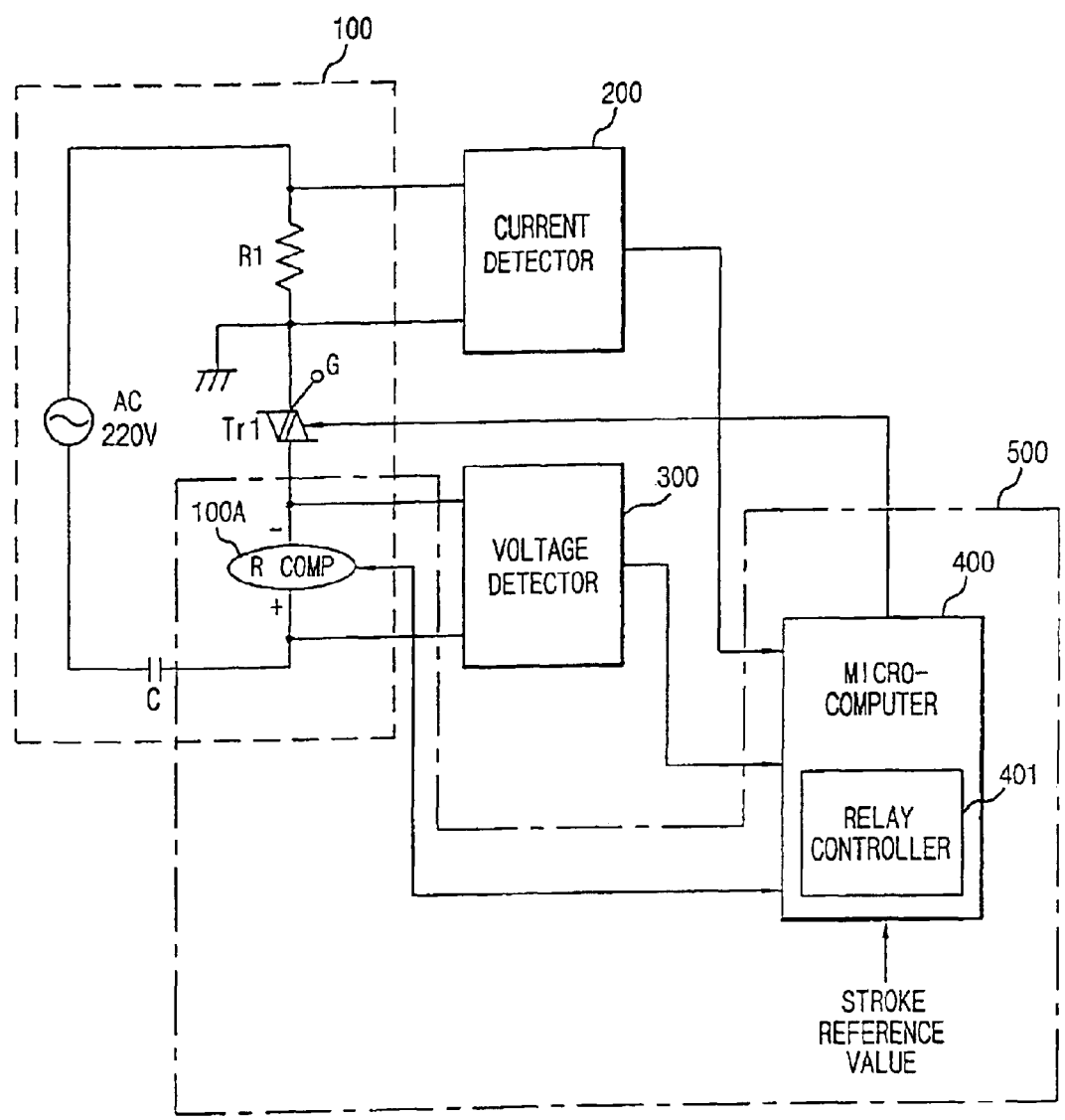
FIG. 2 is a schematic block diagram of a coil winding number variable type motor for varying a cooling and heating capacity of a reciprocating compressor in accordance with a preferred embodiment of the present invention.

FIG. 2 is a schematic block diagram of a coil winding number variable type motor for varying a cooling and heating capacity of a reciprocating compressor in accordance with a preferred embodiment of the present invention.

First, according to an initial stroke reference value by a user, a microcomputer 400 inputs a switching signal to a switching device, that is, a triac (Tr1), performing an AC switching function, to drive a reciprocating compressor 100.

Thereafter, a current detector 200 and a voltage detector 300 detect a current and a voltage generated from the reciprocating compressor, respectively.

By using the detected current and the voltage, the microcomputer 400 compares the initial stroke reference value by the user and a stroke reference value computed during the driving of the reciprocating compressor 100, and outputs a switching control signal, that is, an ON/OFF signal, to the reciprocating compressor 100, to render the computed stroke reference value to follow the initial stroke.

In the reciprocating compressor 100A, the winding number of the coil of the motor 100A-1 is varied according to the switching control signal, thereby performing the stroke controlling.

The stroke controlling is performed by a winding number varying unit 500.

Comparatively, however, in the operation control apparatus of a reciprocating compressor in accordance with the conventional art, the switching control signal outputted from the microcomputer 40 is inputted to the triac (Tr1) and the stroke control is performed in a manner that the stroke computed during the driving follows the current stroke.

In other words, in the conventional art, the stroke control of the reciprocating compressor is performed by using the switching control signal of the switching device, that is, the triac (Tr1).

Figure 3:
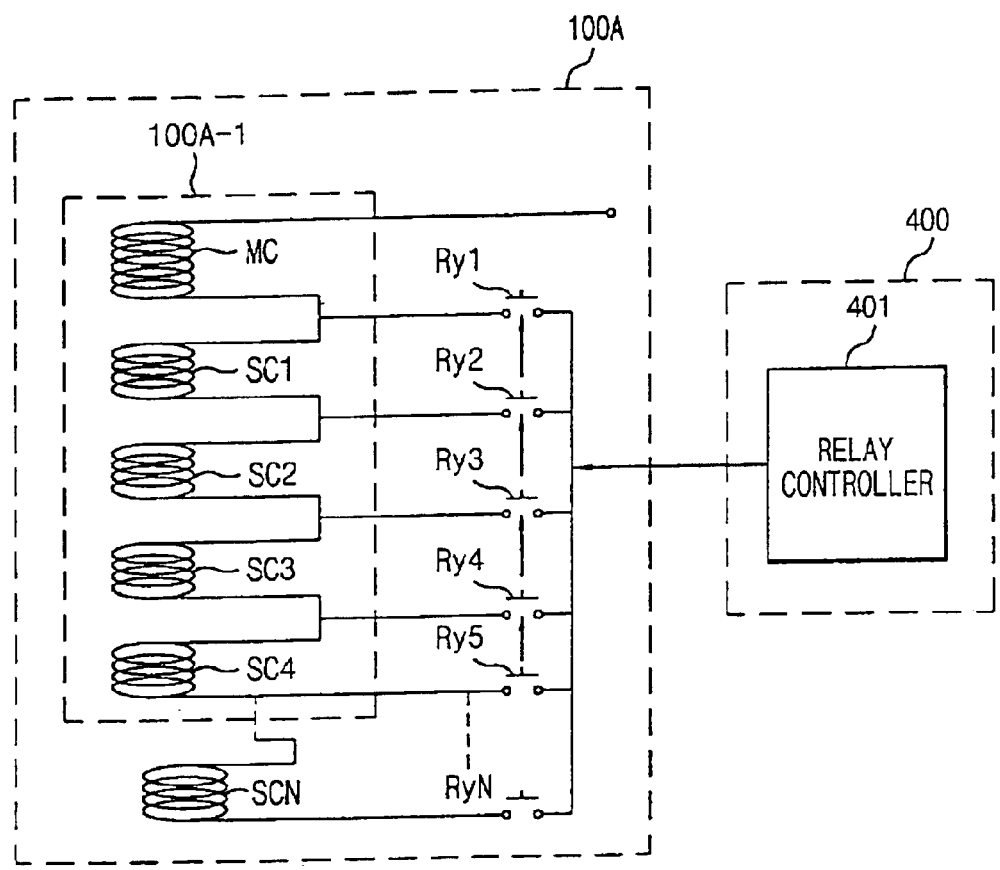
FIG. 3 is a detailed view of a winding number varying unit of FIG. 2 in accordance with the preferred embodiment of the present invention.

FIG. 3 is a detailed view of a winding number varying unit of FIG. 2 in accordance with the preferred embodiment of the present invention, The winding number varying unit varies the winding number of the coil in response to a change in a load and a power supply voltage according to a varied cooling capacity.

As shown in FIG. 3, the winding number varying unit includes a plurality of coils MC and SC1~SC4 separately wound for varying the winding number of motor 100A-1 coils; a relay controller 401 of a microcomputer 400 for outputting an ON/OFF control signal for varying the winding number of the motor 100A-1 coils according to a change in a load and a power supply voltage; and a plurality of relays Ry1~Ry5 connected between the plurality of coils MC and SC1~SC4, for receiving the ON/OFF control signal and varying the winding number of the motor coils.

The coils MC, SC1~SC4 of the motor 100A-1 includes the main coil MC and the plurality of sub-coils SC1~SC4.

The plurality of relays Ry1~Ry5 are connected to the connection terminals of the main coil MC and the plurality of sub-coils SC1~SC4, and receives an ON/OFF control signal from the relay controller 401 of the microcomputer 400, varies the winding number of the motor 100A-1, thereby performing the stroke controlling.

The operation and effect of the coil winding number variable type motor for varying a cooling and heating capacity of a reciprocating compressor constructed as described above will now be explained in detail.

The motor 100A-1 of the reciprocating compressor 100A includes the main coil MC and the first to the fourth coils SC1~SC4 which are independently connected in series, and a first to fifth relays (Ry1~Ry5) which is turned on or off according to a change in a voltage or load, varies the winding number of the motor 100A-1 coil to control the stroke of the reciprocating compressor 100A, the first to fifth relays (Ry1~Ry5) being connected to the connection terminals of the main coil MC and the first to fourth sub-coils (SC1~SC4).

In FIG. 3, though the four sub-coils wound inside the motor 100A-1 are shown, but not limited thereto and the number of coils can be arbitrarily adjusted for use according to the change in the load due to a variable cooling capacity or the change in the power supply voltage. And, the turn ratio of the main coil and the plurality of sub-coils can be suitably varied.

First, the winding number (N) of the coil wound in the motor 100A-1 of the reciprocating compressor 100A is in proportion to a motor constant, and when a certain power supply voltage is applied thereto, the stroke of the reciprocating compressor 100A and the winding number (N) of the coil is in inverse proportion, which can be expressed by the below equation (1).

$$\text{STROKE} = \frac{\text{Voltage}}{\text{Motor constant}} \propto \frac{\text{Voltage}}{N(\text{winding number})} \qquad (1)$$

Accordingly, in the present invention, by using the characteristics of the above expressed equation, the stroke of the reciprocating compressor 100A can be controlled by varying the winding number of the motor 100A-1 coil.

In other words, as for the coil winding number variable type motor for varying a cooling and heating capacity, the motor 100A-1 of the reciprocating compressor 100A is mostly wound with the main coil MC and the remaining portion is wound with the first to the fourth sub-coils SC1~SC4.

The first relay Ry1 is connected between the main coil MC and the first sub-coil SC1. The second relay Ry2 is connected between the first sub-coil SC1 and the second sub-coil SC2. The third relay Ry3 is connected between the second sub-coil SC2 and the third sub-coil SC3. The fourth relay Ry4 is connected between the third sub-coil SC3 and the fourth sub-coil SC4. The fifth relay Ry5 is connected to the output terminal of the fourth sub-coil SC4.

Thereafter, the first through the fifth relays Ry1~Ry5 are turned on or off according to the change in the voltage and load, so that the winding number of the motor 100A-1 coil to control the stroke of the reciprocating compressor 100A.

A method for controlling the stroke by using the coil winding number variable type motor for varying a cooling and heating capacity of the reciprocating compressor 100A will now be described.

By using the relationship that the stroke of the reciprocating compressor 100A and the winding number of the motor 100A-1 coil are in inverse proportion, when a certain power supply voltage is applied, if the greatest stroke is to be generated, the first relay Ry1 is turned on and the second to the fifth relays Ry2~Ry5 are turned off, thereby reducing the winding number of the internal coil of the motor 10A-1.

Reversely, if the smallest stroke is intended to be generated, the fifth relay Ry5 is turned on and the first through the fourth relays Ry1~Ry5 are turned off, so that the winding number of the internal coil of the motor 100A-1 is increased, thereby performing the stroke controlling.

In order to control the stoke by varying the winding number of the motor coil according to the change in the voltage and the load, the first through fifth relays Ry1~Ry5 receive an ON/OFF control signal from the relay controller 401 of the microcomputer 400.

Figure 4:
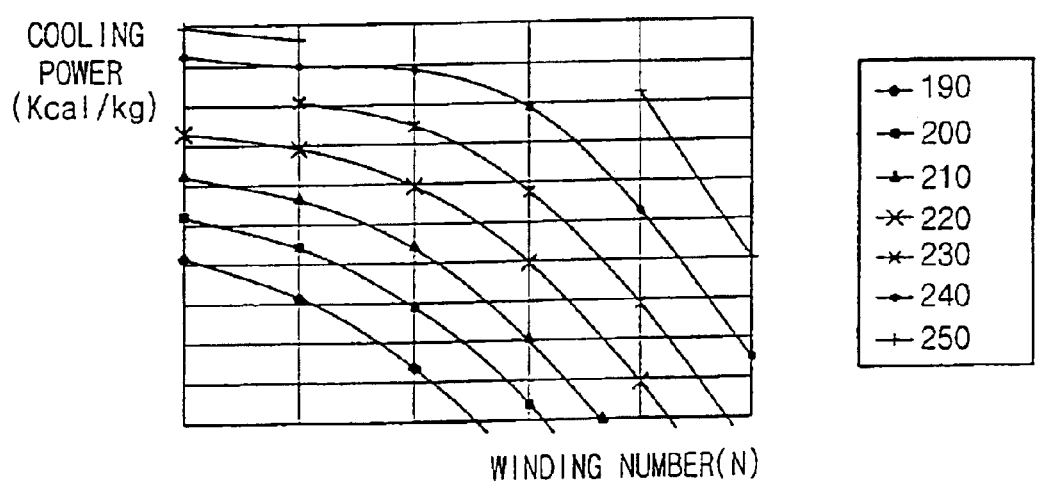
FIG. 4 is a graph showing a relationship between a cooling capacity and the winding number in case that the coil winding number variable type motor of the present invention is adopted to an air-conditioner.

FIG. 4 is a graph showing a relationship between a cooling capacity and the winding number in case that the present invention is adopted to an air-conditioner.

As shown in FIG. 4, it is noted that a cooling capacity is in inverse proportion to the winding number (N) of the motor 100A-1 almost linearly.

In other words, in applying a certain power supply voltage, by using the characteristics that the stroke and the winding number (N) of the coil are almost linearly in inverse proportion, the plurality of relays (Ry) are connected between the main coil MC and the plurality of sub-coils SC. And then, the plurality of relays (Ry) are turned on or off according to the change in the power supply voltage and the load due to the variable cooling capacity, to vary the winding number (N) of the motor 100A-1 coil, so that the stroke of the reciprocating compressor can be smoothly controlled without being influenced by the change in the voltage or the load.

The present invention is not limited to the reciprocating compressor, and can be applied to a linear compressor and another compressor.

As so far described, the coil winding number variable type motor and the coil winding number varying method for varying cooling and heating capacity of a reciprocating compressor of the present invention have the following advantage.

That is, the coil wound in the motor of the reciprocating compressor is divided into the main coil and the plurality of sub-coils and the winding number of the motor coil is varied by itself to control the stroke of the reciprocating compressor, thereby effectively coping with the change in the voltage or the load.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A coil winding number variable type motor and motor controller for varying a cooling and heating capacity of a reciprocating compressor coupled to the motor, comprising:
   a motor coil comprising a plurality of coils separately wound and connected in series to each other such that a number of operative turns of the motor coil can be varied;
   a plurality of relays respectively connected between adjacent coils among the plurality of coils;
   a controller configured to detect a change in load and a power supply voltage and to output a corresponding control signal based on the detected change in load and power supply voltage; and
   a relay controller configured to receive the control signal output by the controller and to output a corresponding ON/OFF signal to control each of the plurality of relays.

2. The motor and controller of claim 1, wherein the motor coil comprises:
   a main coil wound in the motor and configured to occupy a majority of the winding number of the motor coil; and
   a plurality of sub-coils wound in the motor and configured to be connected to the main coil.

3. The motor and controller of claim 2, wherein a turn ratio of the main coil and the plurality of sub-coils is varied according to a variable cooling capacity required for the reciprocating compressor.

4. The motor and controller of claim 1, wherein when a certain power supply voltage is applied, the controller controls the plurality of relays to be turned on or off, thereby controlling a stroke of the compressor according to a desired cooling capacity.

5. The motor of claim 1, wherein the relay controller is configured to decrease the number of operative turns of the motor coil when a greater stroke of the reciprocating compressor is desired.

6. The motor of claim 1, wherein the relay controller is configured to increase the number of operative turns of the motor coil when a smaller stroke of the reciprocating compressor is desired.

7. The motor of claim 1, further comprising a current detector configured to detect an electrical current applied to the motor, and to output a current signal to the controller, wherein the control signal output by the controller is based on the current signal received from the current detector.

8. The motor of claim 7, further comprising a voltage detector configured to detect a voltage applied to the motor, and to output a voltage signal to the controller, wherein the control signal output by the controller is based on the voltage signal received from the voltage detector.

9. The motor of claim 1, further comprising a voltage detector configured to detect a voltage applied to the motor, and to output a voltage signal to the controller, wherein the control signal output by the controller is based on the voltage signal received from the voltage detector.

10. A method for controlling a coil winding number variable type motor that is coupled to a reciprocating compressor, comprising:

determining the winding number of a coil of the motor required for a desired stroke of the reciprocating compressor when a predetermined voltage is applied to the motor;

decreasing a number of sub-coils connected to a main coil and applying a voltage to the main coil and sub-coils connected thereto by controlling a plurality of relays respectively connected between adjacent sub-coils and the main coil when a large stroke is required for the reciprocating compressor; and increasing the number of sub-coils connected to the main coil and applying a voltage to the main coil and sub-coils connected thereto by controlling a plurality of relays respectively connected between adjacent sub-coils and the main coil when a small stroke is required for the reciprocating compressor.

11. The method of claim 10, wherein the determining step comprises sensing a current applied to the motor.

12. The method of claim 11, wherein the determining step further comprises sensing a voltage applied to the motor.

13. The method of claim 10, wherein the determining step comprises sensing a voltage applied to the motor.

14. An electric appliance, comprising:

a reciprocating compressor;

a motor coupled to the compressor, wherein the motor includes a coil comprising a plurality of sub-windings configured to be selectively connected in series a plurality of relays respectively connected between adjacent sub-windings of the plurality of sub-windings;

at least one sensor configured to sense at least one operating condition of the compressor and to output at least one corresponding signal; and a motor controller configured to receive the at least one signal, and to selectively switch the plurality of relays based on the at least one signal so as to vary the number of operative sub-windings of the coil.

15. The appliance of claim 14, wherein the at least one sensor comprises a current sensor configured to sense a current applied to the motor and to output a current signal to the motor controller.

16. The appliance of claim 15, wherein the at least one sensor further comprises a voltage sensor configured to sense a voltage applied to the motor and to output a voltage signal to the motor controller.

17. The appliance of claim 14, wherein the at least one sensor comprises a voltage sensor configured to sense a voltage applied to the motor and to output a voltage signal to the motor controller.

18. The appliance of claim 14, wherein the motor controller is configured to reduce the number of operative windings of the coil when a greater load must be satisfied by the compressor.

19. The appliance of claim 14, wherein the motor controller is configured to increase the number of operative windings of the coil when a smaller load must be satisfied by the compressor.

20. The appliance of claim 14, wherein the plurality of sub-windings comprise a main winding with a first number of windings, and a plurality of lesser windings, each lesser winding having fewer windings that the main winding.

* * * * *